S. K. Lighter.
Harvester Rake.

No. 60,392.  Patented Dec. 11, 1866.

Attest.
James H. Layman.
J. Millward

Inventor.
S. K. Lighter
By Knight Bros
Attys

United States Patent Office.

IMPROVEMENT IN HARVESTER RAKES.

SAMUEL K. LIGHTER, OF HAMILTON, OHIO.

Letters Patent No. 60,392, dated December 11, 1866; antedated October 28, 1866.

*The Schedule referred to in these Letters Patent and making part of the same.*

TO ALL WHOM IT MAY CONCERN:

Be it known that I, SAMUEL K. LIGHTER, of Hamilton, Butler county, Ohio, have invented a new and useful improvement in Harvesting machines; and I do hereby declare the following to be a full, clear, and exact description thereof, reference being had to the accompanying drawings, making part of this specification.

My invention relates to the class of harvesters which carry a vibrating rake, and consists in a more compact and effective arrangement of devices for acting upon the rake stem—

Figure 1:
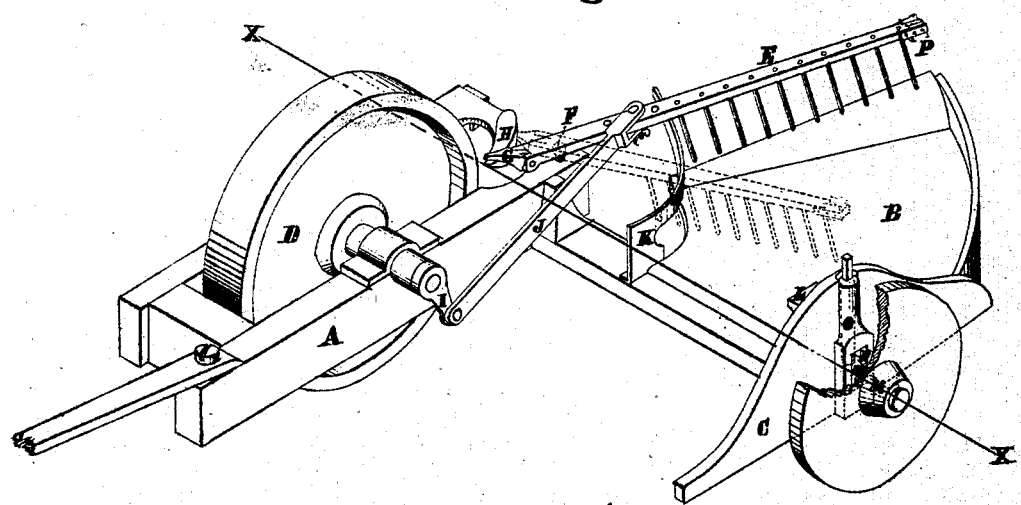
Figure 1 is perspective view of a portion of a harvester embodying my invention.
Figure 2:
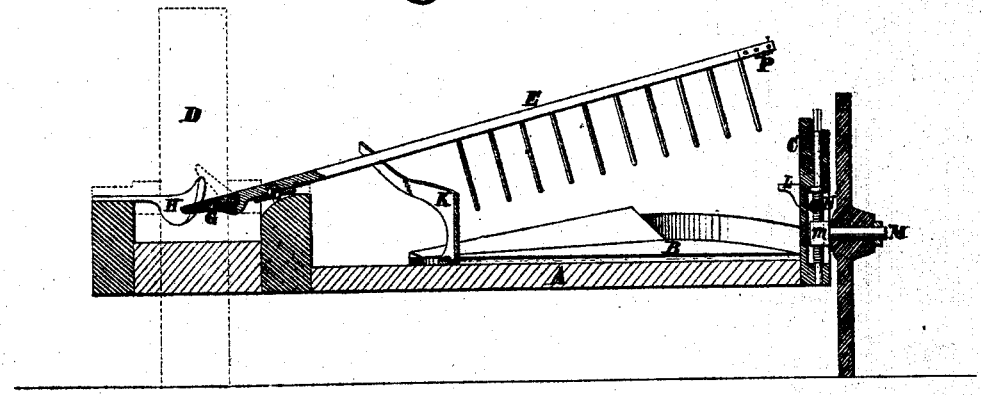
Figure 2 is a transverse section, taken at the line x x, fig. 1.

A represents a portion of the main frame, B is the platform, C is the divider, D is the driving wheel. The rake, E, is secured to the frame by means of a ball and socket, or other universal joint or fulcrum, F, situated near the heel end of the rake-stem, which end has the limber heel, G, butt-hinged to it, whereby said heel is made capable of folding upward but not downward. The heel G, as the rake is vibrated to and fro, makes the circuit of a fixed cam or guide, H, which projects from the frame. I is a crank on the inner end of the main shaft, connected by pitman, J, to the rake-stem, somewhat outside of or on the grain side of the fulcrum. K is a fixed cam or guide, which rises from and follows the contour of the inner edge of the platform, which is coincident with the arc of a circle struck from the fulcrum. The upper edge of the guide, K, is carried back horizontally until it approaches the rear edge of the platform, and thence rises slightly to its rear end. The guide K serves to cofine the grain to the platform, and co-operates with the inner guide H, joint F, and heel G, to impart the desired rising and falling motions to the rake while being vibrated forward and backward by the pitman J. In order to ease the rake down on to the platform, and to prevent the violent concussion usually incident to the return of the rake to the platform, I provide a ledge, L, which projects horizontally inward from the divider C, and I provide a cushion, P, of India-rubber on the under side of the rake-head, at its tip, which cushion, by alighting upon the said ledge L, breaks the force of the concussion of the descending rake. In order to enable the positive and definite vertical adjustment of the outer or grain side of the platform, I provide the inner end of the grain-wheel axle, M, with an internally screw-threaded head, m, which is housed in a vertical slot, N, in the divider C, and receives a screw, O, journaled in said divider. The operation of my rake, in the process of raking back the grain, is as follows: The stem of the rake rests and slides upon the level portion of the guide K, during the greater portion of its backward or effective stroke, until reaching the rise K, said rise then operates in conjunction with the fixed universal fulcrum, F, and pitman J, to simultaneously lift the rake backward and upward from the grain, the rake-head being at the same time slightly canted backward, so as to enable its teeth to withdraw easily from the grain, by moving in the direction of their length, the limber-heel, G, merely resting lightly and gliding forward along the ridge of the fixed cam H, as at 1 fig. 1, until at the termination of the backward or effective sweep of the rake, the said heel drops in front of the point of the said cam, so as, on the commencement of the return stroke of the rake, to engage beneath the said cam, and be pressed downward by it, thus elevating the rake clear of the platform, and holding it clear of the next batch of grain, until it reaches the proper position for descending, as at 2 fig. 1.

It will be seen that in my arrangement, the device for conducting the rake forward clear of the grain to its starting position is placed wholly on the inside of the joint or fulcrum. This enables the use of a very compact and simple form of bridge, of less weight and bulk and less liable to becoming entangled with grain than the form usually employed.

I claim herein as new and of my invention—

The arrangement of rake E, universal joint or fulcrum F, limber-heel G, fixed cam H, pitman J, and guide K k, the whole being constructed, combined, and adapted to operate in the manner set forth.

In testimony of which invention, I hereunto set my hand.

S. K. LIGHTER.

Witnesses:
   GEO. H. KNIGHT,
   JAMES H. LAYMAN.